United States Patent [19]

Blakeley

[11] Patent Number: 5,149,144
[45] Date of Patent: Sep. 22, 1992

[54] PIPE BRANCH FITTING AND BRANCH APPLIANCE THEREFOR

[75] Inventor: James Blakeley, Thornhill, Canada

[73] Assignee: Sprink, Inc., Fullerton, Calif.

[21] Appl. No.: 324,953

[22] Filed: Mar. 16, 1989

Related U.S. Application Data

[63] Continuation of Ser. No. 157,221, Feb. 18, 1988, abandoned.

[51] Int. Cl.⁵ .......................................... F16L 55/00
[52] U.S. Cl. ...................................... 285/23; 285/24; 285/93; 285/39; 285/197; 285/330; 285/910
[58] Field of Search ............... 285/197, 198, 199, 348, 285/12, 23, 24, 93, 39, 330, 910; 138/89, 89.4

[56] References Cited

U.S. PATENT DOCUMENTS

| | | | |
|---|---|---|---|
| 773,710 | 11/1904 | Bronson | 285/198 |
| 1,057,708 | 4/1913 | Chapin | 285/197 |
| 2,932,324 | 4/1960 | Fisher | 138/89 |
| 3,218,093 | 11/1965 | Carlson | 285/197 |
| 3,574,312 | 4/1971 | Miller | 138/89 |
| 4,073,513 | 2/1978 | Blakeley | 285/197 |
| 4,519,449 | 5/1985 | Hoskins et al. | 285/4 |
| 4,728,040 | 3/1988 | Healy et al. | 285/12 |

FOREIGN PATENT DOCUMENTS

| | | | |
|---|---|---|---|
| 831046 | 2/1952 | Fed. Rep. of Germany | 285/197 |
| 879148 | 2/1943 | France | 285/197 |

Primary Examiner—Dave W. Arola
Attorney, Agent, or Firm—Harness, Dickey & Pierce

[57] ABSTRACT

An improved pipe branch fitting for use with a pipe having a pre-cut hole is disclosed. The branch fitting has a cylindrical body freely slidable along the pipe to a point where the hole is pre-cut. On one side, the cylindrical body carries an internally threaded boss into which a modified sprinkler head may be threaded. A gasket positioned between the sprinkler head and the pipe gives the seal as the sprinkler head bears upon the gasket upon tightening of the sprinkler head. The inner end of the modified sprinkler head has a stepped shoulder which abuts the periphery of the hole in the pipe and limits compression applied to the gasket. A reduced diameter end portion of the modified sprinkler head locates itself in the hole and indicates if the fitting is misaligned with the hole. The end walls of the body are each tapered toward the boss to facilitate the sliding of the cylindrical body, when assembled on the pipe are supporting structures of a building in which the piping system is being installed.

10 Claims, 2 Drawing Sheets

PIPE BRANCH FITTING AND BRANCH APPLIANCE THEREFOR

This is a continuation of U.S. patent application Ser. No. 07/157,221, filed Feb. 18, 1988 and now abandoned.

BACKGROUND AND SUMMARY OF THE INVENTION

The present invention relates to pipe branch fittings intended for use where a pipe branch or branch appliance is to be attached over a hole pre-cut in the wall of a main pipe. The branch may be in the form of a pipe section, or as is common in building sprinkler systems, may be a water sprinkler head, or other branch appliance. The present invention is an improved version of the pipe branch fitting described and claimed in my U.S. Pat. No. 4,073,513, issued Feb. 14, 1978, which earlier patent is hereby incorporated by reference. The improvement disclosed herein resides essentially in the elimination of the need for a separate "fitting part", as that term is used in my earlier patent. In place of the fitting part, the present invention utilizes a modified branch appliance. This improvement significantly simplifies both the manufacturing and installation of the pipe branch fitting and the branch appliance. Moreover, the use of my improved pipe branch fitting significantly reduces the installation time required with prior art branch fittings, which require the installer to "dope" or TEFLON (polytetrafluorothylene) tape the threaded portion of the sprinkler head or other branch appliance received in the branch fitting. In the branch fitting of the present invention a resilient sealing gasket accomplishes this sealing function, thus eliminating this time-consuming and tedious installation step. Furthermore, the elimination of an additional threaded connection (i.e. the additional connection of the fitting part) at the location of each pipe branch fitting increases the reliability of the entire liquid distribution system with which my improved branch fitting is used, as it eliminates numerous potential sources of leakage in the system.

Another advantage of my improved pipe branch fitting over the prior art resides in the tapered profiling of the end walls of the body portion of the fitting. As seen in my U.S. Pat. No. 4,073,513, the end walls of the body of the fitting are oriented generally perpendicularly to the longitudinal axis of the pipe with which they are used. In contrast, the end walls of my improved pipe branch fitting are preferably slanted axially inwardly towards one another to produce a branch fitting of tapered side profile. This slanting of the end walls assists installers of the piping system by allowing easier movement of pipe lengths, on which a plurality of the pipe branch fitting have already been positioned, across building on ceiling cross-members. The disadvantage with previous pipe branch fittings not having this feature is that the perpendicular end walls of the branch fitting body act as "stops" when in contact with such cross-members, requiring added effort on the part of the installers to lift the entire pipe length and attached branch fittings at each crossing. The tapered design of my improved branch fitting allows the body of the fitting to "ride" over the cross-members, since the slanting of each end wall acts as a cam to assist in overriding these objects when normal push-through action combined with rotation of the pipe length is used. Additionally, the tapered branch fitting body results in an approximate 20% reduction in material weight, which also assists installation and reduces production costs.

There is also disclosed, according to the present invention, a novel shipping plug, of plastic or similar material, which may be placed in a threaded boss of the pipe branch fitting so as to allow pre-positioning of the pipe branch fittings and enclosed sealing gaskets over the pre-cut holes in the wall of the main pipe, prior to job-site shipping or installation.

There is thus provided, according to one aspect of the present invention, in combination, an improved pipe branch fitting and branch appliance for use with a pipe having a pre-cut hole. The branch fitting comprises an embracement member having a cylindrical inner surface adapted for embracement around the pipe at the position of the hole. An upstanding, hollow, internally threaded boss is positioned on one side of the embracement member, and a resilient sealing gasket is located on the inner side of the boss. The branch appliance, which is, preferably, a sprinkler head assembly, comprises a threaded portion adapted for retention in the threaded boss of the embracement member, and a generally planar annular surface bearing on the sealing gasket. The threaded portion is formed adjacent its inner end with a reduced diameter spigot end portion. The spigot end portion is sized and otherwise adapted for positioning in the pre-cut hole of the pipe. The branch appliance is provided adjacent its opposite outer end with one or more wrench receiving surfaces, so that the branch appliance can be turned by a wrench to displace the branch appliance inwardly (i.e., toward the center of the pipe) to compress the sealing gasket against the pipe. An inward-facing shoulder is provided on the spigot end portion for abutment on the outer surface of the pipe, within the sealing gasket. With this arrangement, the compression applied to the gasket by inward tightening of the branch is restricted to a predetermined limit. The spigot end portion is also adapted, when inserted through the pre-cut hole in the pipe, to extend a short distance beyond the aforementioned inward-facing shoulder.

The sealing gasket has at least one annular surface portion lying in a single transverse plane, and also an annular saddle-shaped lower surface adapted to conform to the surface of the pipe around the pre-cut hole. The sealing gasket is adapted to be confined between and in substantially complete conformity with the adjacent surfaces of the branch appliance, the embracement member and the pipe. The embracement member is, preferably, a continuous cylindrical tube, the opposite axial end walls of which tube slant axially, inwardly towards one another.

In another aspect of the present invention, there is provided an improved branch appliance for use with a pipe branch fitting of the general type having a cylindrical inner surface adapted for embracement around a pipe at a point where the pipe has a pre-cut hole. The embracement member has an upstanding, hollow, internally threaded boss on one side of the member, and a resilient sealing gasket is used on the inner side of the boss. According to this aspect of the invention, the improvement comprises the provision on the branch appliance of a threaded portion for retention in the threaded boss, such threaded portion having a generally planar annular surface adapted to bear rotatably on the sealing gasket, and being formed adjacent its inner end with a reduced diameter spigot end portion adapted for positioning in the pre-cut hole. The branch appliance is adapted, adjacent its opposite outer end, with one or more wrench receiving surfaces, so that it can be turned by a wrench to displace the branch appliance inwardly into the internally threaded boss, thereby to compress the sealing gasket against the pipe. The branch appliance further comprises an inward-facing shoulder adjacent to the spigot end portion for abutment on the surface of the pipe within the sealing gasket, whereby the compression applied to the gasket is restricted to a predetermined limit. In this manner, the spigot end portion is adapted, in use, to extend a short distance beyond the inward-facing shoulder. The sealing gasket has at least one upper surface portion lying in a generally transverse plane, and a saddle-shaped lower surface adapted to conform to the surface of the pipe around the pre-cut hole. The gasket is adapted to be confined between and in substantially complete conformity with the adjacent surfaces of the branch appliance, the embracement member and the pipe.

BRIEF DESCRIPTION OF THE DRAWINGS

In order that the invention may be more fully and readily understood, a single embodiment thereof will now be described by way of example only, with reference to the accompanying drawings in which.

DESCRIPTION OF THE PREFERRED EMBODIMENT

Figure 1:
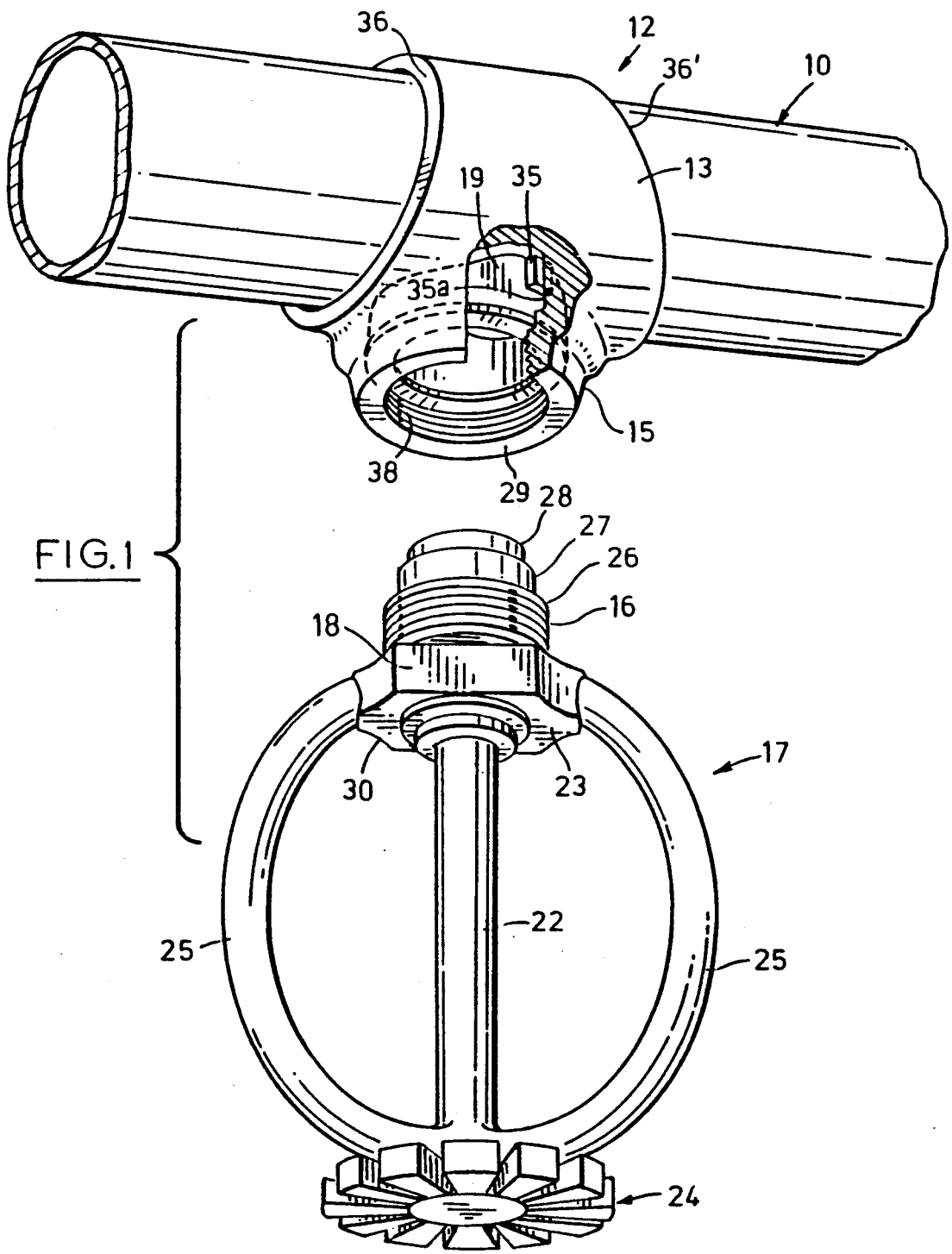
FIG. 1 is a perspective view of a pipe branch fitting and branch appliance according to the invention in use with a pipe having a pre-cut hole, with areas cut away to reveal interior details.

Referring to the drawings, wherein like reference numerals indicate like parts, there will be seen a main pipe 10 having a pre-cut hole 11 over which is centered a pipe branch fitting 12 in the form of a generally cylindrical embracement member 13 in embracing relationship around the pipe 10. The embracement member 13 has a generally cylindrical inner surface 14 and is sized internally so it can be slid freely along the pipe 10 to a desired point where the branch is to be provided.

One side of the embracement member 13 carries a raised hollow boss 15 which is internally threaded for retention in the boss 15 of a threaded portion 16 of a branch appliance 17, which, as shown, is, a sprinkler head. The term "branch appliance" as used in the specification and claims of this application includes sprinkler heads, but also includes any other type of fitting that may be desirable to be connected to a main pipe 10 and could, for example, simply be a second length of pipe. The branch appliance 17 is advantageously provided, with one or more wrench receiving surfaces 18 which, as shown, form a basal nut portion 23 to allow the branch appliance 16 to be readily tightened and slackened using a wrench (not shown).

Figure 3:
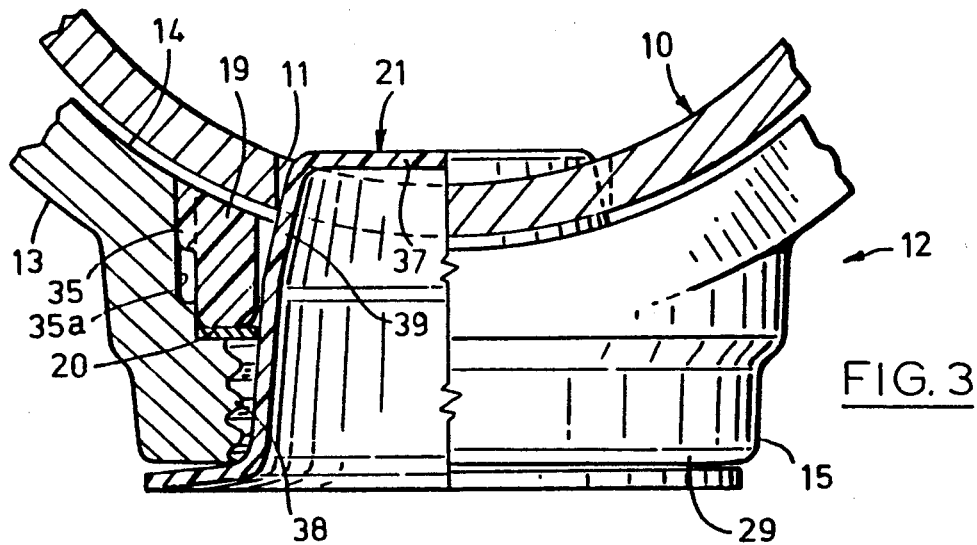
FIG. 3 is a vertical section (partly in perspective) through the fitting of FIG. 1, with a plastic shipping plug inserted in the branch fitting to locate the assembly over a pre-cut hole in the pipe of FIG. 1.

A ring-form resilient sealing gasket 19 of a rubber or synthetic elastomer is fitted within the root of the boss 15, and is pre-assembled as shown with the embracement member 13, and, preferably, a metal or fiber washer 20, before the whole assembly is slid along the pipe 10 from one end. Once the assembly is so located over a selected pre-cut hole 11 of the pipe 10, it may be held in place for shipping or further assembly and installation by means, of a hollow shipping plug 21, constructed of, for example, semi-resilient plastic material, as seen in FIG. 3. In this manner, a plurality of the branch fitting or assemblies on the invention may be pre-assembled on a length of pipe 10 for hoisting into a building structure for subsequent insertion of branch appliances 17, as more fully discussed below.

Inessential details of the head portion of the branch appliance 17 shown in FIG. 1 have been omitted for the purposes of illustration, but such sprinkler heads 17 typically comprise a central supply tube 22 leading outwardly from the basal nut portion 23 to a distribution head 24, the supply tube 22 being stabilized by two congruent arches 25, which arches lead outwardly from the basal nut portion 23 to the distribution head 24. The inner end of the sprinkler head 17 is of a double-stepped configuration, with a first or outer shoulder 26 defining an annular surface 31 adapted for bearing rotatably on the sealing gasket 19 (whether directly, or, as shown, through the agency of washer 20 interposed therebetween), and a second or inner shoulder 27 from which the inner end of the branch appliance 17 tapers slightly into a reduced width spigot end portion 28, as seen in FIGS. 1 and 4.

It will be readily appreciated that the reduced width end spigot portion 28 is in fluid communication with the supply tube 22.

In use, after pre-cutting the hole 11 to a diameter appropriate to receive the spigot end portion 28, the embracement member 13 is slid from one end from pipe 10 to the position of the hole 11, and the branch appliances 17 is then tightened up to compress the sealing gasket 19 into a tight seal between the branch appliance 17 and the pipe 10.

Figure 4:
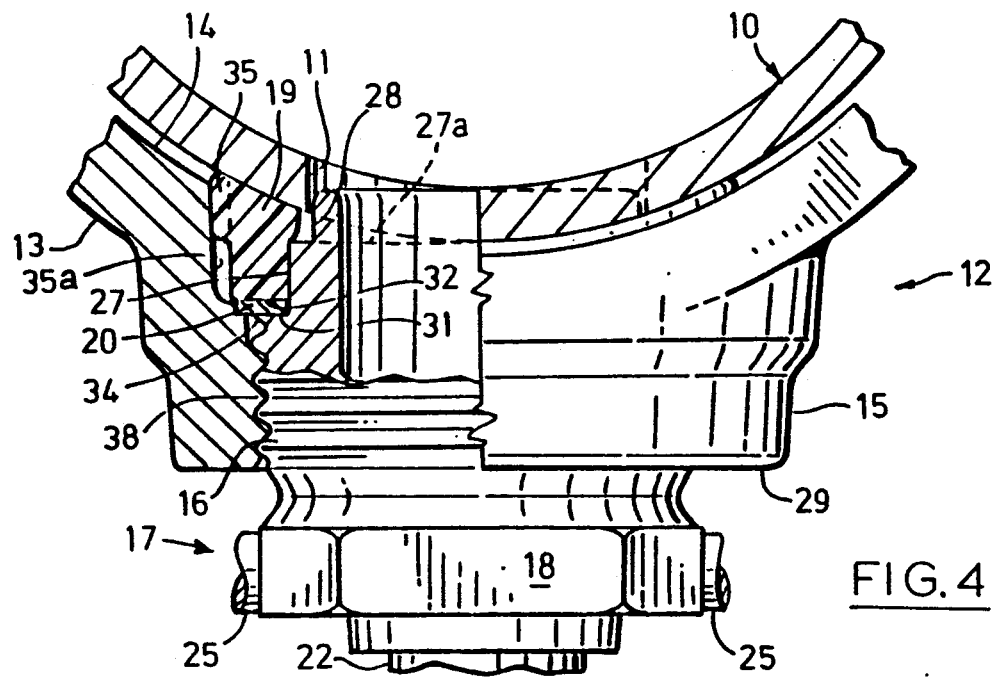
FIG. 4 is a view similar to FIG. 3, wherein the shipping plug has been replaced by a novel branch appliance according to the invention.

As the branch appliance 17 is displaced inwardly upon tightening, the portion of the embracement member 13 opposite to the boss will be drawn into tight engagement with the outer surface of the pipe 10, and at a predetermined point, the inner shoulder 27 of the branch appliance 17 will come into abutment with the periphery of the pipe wall about the hole 11, as shown in broken lines in FIG. 4, the line 27a showing the circumferential continuation of the shoulder 27. This abutment prevents further compression of the sealing gasket 19 beyond a pre-determined limit. By appropriate selection of the thickness of the gasket and the maximum extent of inward movement of the branch appliance 17, the maximum compression of the gasket can be such as will give optimum sealing both initially and throughout the service life of the fitting. In the preferred embodiment shown, a clearance exists between the free end 29 of the boss 15 and the enlarged basal nut portion 23 of the branch appliance 17 at maximum tightening, and the enlarged basal nut portion 23 does not serve as a stop for tightening of the branch appliance 17.

The reduced diameter spigot end portion 28 locates itself in the pre-cut hole 11 during the tightening operation, and any degree of free rotation of the fitting above the pipe 10 will immediately indicate if there is any misalignment of the pipe branch fitting 12 as a result of the spigot end portion 28 lodging on the exterior surfaces of the pipe 10. Moreover, it will be appreciated that the position of the enlarged basal portion 23 of the branch appliance 17 relative to the free end 29 of the boss 15, when the branch appliance 17 is tightened up, serves as a visual indication of whether the spigot end portion 28 is properly aligned in the pre-cut hole 11.

Figure 2:
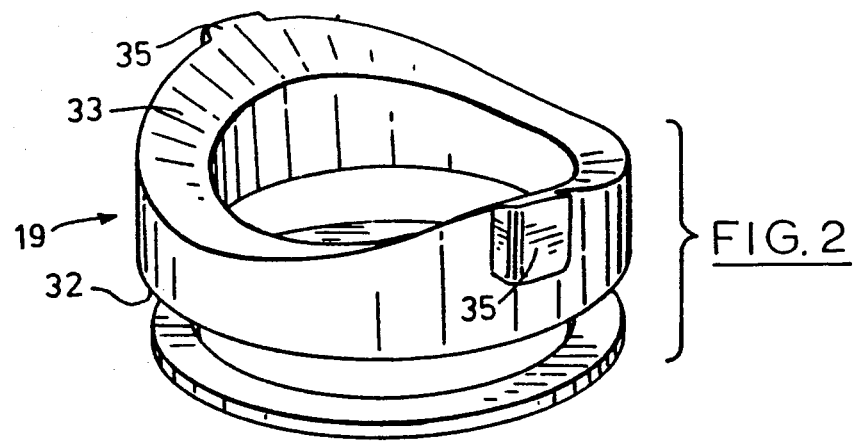
FIG. 2 shows, in isolated perspective view, the resilient sealing gasket and washer member employed in FIG. 1.

A more detailed view of the resilient sealing gasket 19 is shown in FIG. 2. The gasket 19 has an upper annular surface portion 32 lying substantially in a single transverse plane, and an annular saddle-shaped surface portion 33 adapted to conform to the exterior surface of the pipe 10 around the pre-cut hole 11, the gasket being adapted to be confined between and in a substantially complete conformity with the adjacent surfaces of the branch appliance 17, the embracement member 13, the pipe 10, and, where used, the washer member 20. Where no washer member is used in the assembly, the annular surface 32 of the sealing gasket 19 binds with the leading thread 34 of the threaded portion 16 in the fully tightened state, the sealing gasket 19 being confined against lateral expansion by the surrounding wall of the boss 15. It is, however, preferable to use a metal or fiber washer 20 as shown, so as to obtain a more even seal, and so as to minimize the chance of damage to the sealing member 19 during tightening of the branch appliance 17.

The sealing gasket 19 is advantageously provided with a pair of lateral keying projections 35 engaging in corresponding recesses 35a in the root of the boss 15, thereby serving to maintain the specially-arced profile of the lower annular surface 33 in sealing alignment with the curved exterior surface of the pipe 10.

It will be noted that the annular surface 33 of the sealing gasket 19 is saddle-shaped so as to conform with the adjacent surface of the pipe 10. It will be appreciated from FIG. 4, that, in use, the sealing gasket 19 is confined between and in substantially complete conformity with the washer 20, the inner shoulder 27 on the spigot end portion 28, the inner surface of the boss 15 and the exterior of the pipe 10.

As it will be seen most easily in FIG. 1, it is preferred that the opposite axial end walls 36, 36' of the embracement member 13 slant axially inwardly in a substantially congruent fashion, such that the wall portion of the embracement member opposite to the centrally positioned hollow boss 15 is substantially narrower than the wall portion of the embracement member 13 from which the boss 15 projects. In this manner, if one were to imagine a bi-secting plane directed along the longitudinal axis at the threaded boss (which axis is transverse to the axis of the pipe 10), the two halves of the embracement member 13 defined by such a plane will be substantially mirror images of one another in the said plane.

As previously discussed, the purpose of the slanting of the end walls 36, 36' is to assist the installer in jockeying the pipe branch fitting 12, pre-positioned on the pipe 10, through or over various ceiling or other building structures upon installation of a pre-assembled pipe length. Moreover, it will be appreciated that slanting of the end walls 36, 36' in this manner affects a significant material saving in the production of the embracement member 13. The size of the acute angle of an end wall 36, 36' from perpendicular may vary substantially, depending upon the diameter of the embracement member 13 and the strength requirements of the embracement member 13. A useful range of angles is between 18°-13° where the inside diameter of the embracement member varies from 1" to 2½", respectively.

The pipe branch fitting shown and described herein is particularly useful for application in fire protection sprinkler systems, where it is useful for the connection of branch appliances to main pipes, and particularly for connecting sprinkler heads, such as shown in FIG. 1, to such pipes.

There is shown in FIG. 3 a novel form of shipping plug 21 that may be used in conjunction with the containment member 13 and the resilient sealing member 19 for in-shop pre-assembly of piping systems. In such instance, the containment member 13 and the sealing gasket 19 are pre-positioned on the main pipe 10 over a pre-cut hole 11 and the plug which may be made of for example, semi-resilient plastic or vinyl material, is positioned in the threaded boss 15 as shown in FIG. 3, with its inner end 37 protruding through the hole 11 into the lumen of the pipe 10. The plug is dimensioned to fictionally engage the internal threading 38 of the boss 15, so as to be retained therein and may, as by tapered end portion 39, fictionally engage the pre-cut hole 11 in a progressive manner so as to hold the assembly in position on the pipe 10. Once the pipe, with a plurality of branch fittings thus positioned thereon, is hoisted into its final installation position, the plug 21 is simply removed by the installer and the branch appliance 17 is screwingly inserted into the boss 15 with consequential compression of the sealing gasket as previously described. Because of the fragility of branch appliances 17, it is impractical to ship them pre-assembled on the pipe lengths. There is thus provided, by the shipping plug 21, a means for allowing partial pre-assembly of the piping system on the ground, or in other more favourable working conditions. In this manner, the complexity of the final installation step of multi-branch piping systems, which is typically carried out overhead, is greatly simplified, thus saving time and strain on the installer.

It will be understood that the form of invention herein shown and described is a preferred example only, and various modifications and changes can be carried out without departing from the spirit of the invention or the scope of the appended claims. For example, as previously mentioned, the use of the washer 20 is entirely optional. Moreover, the exact form and configuration of the sealing gasket 19 can vary significantly, and may, for example, take the configuration shown in FIG. 3 of my U.S. Pat. No. 4,073,513. These and other obvious changes to the form and configuration of the invention will be readily apparent to those skilled in the art.

I claim:

1. In combination, a pipe branch fitting and a sprinkler for use with a pipe having a pre-cut hole, the branch fitting comprising:
   (a) a continuous cylindrical tube having a cylindrical inner surface adapted for embracement around the pipe at the position of the hole and having opposing axial end walls that slant axially inwardly towards one another;
   (b) an upstanding hollow, internally threaded boss on one side of the cylindrical tube;
   (c) a resilient sealing gasket at the inner side of the boss; and a one-piece sprinkler head comprising:
      (i)(a) a threaded portion adapted for retention in the threaded boss and having a generally planar annular surface bearing rotatably on the sealing gasket and being formed adjacent its inner end with a reduced diameter spigot end portion adapted for repositioning in the pre-cut hole of the pipe, adjacent its opposite outer end with at least one wrench receiving surface so that the sprinkler head can be turned by a wrench means to displace the sprinkler head inwardly into the threaded boss to compress the sealing gasket against the pipe, (b) an inward-facing shoulder on the spigot end portion for abutment on the outer surface of the pipe within the sealing gasket, whereby the compression applied to the gasket by the sprinkler head is restricted to a predetermined limit, the spigot end portion extending axially beyond the threaded portion and being adapted, in use, to extend a short distance beyond said inward-facing shoulder and (c) a distribution means for sprinkling fluid exiting the pipe; and (ii) wherein the sealing gasket has at least one annular surface portion lying substantially in a generally transverse plane, and a saddle-shaped annular surface portion adapted to conform to the surface of the pipe around the pre-cut hole of the pipe and being adapted to be confined between and in substantially complete conformity with the adjacent surfaces of the sprinkler head the branch fitting, and the pipe.

2. The combination of claim 1 wherein the branch fitting has inner wall surfaces confining the sealing gasket internally.

3. The combination of claim 2 additionally comprising a washer member positioned in said second inner zone interposed between said annular surface of the sprinkler head and the sealing gasket.

4. The combination of claim 2, wherein the sealing gasket extends upwardly sufficiently to bind with the thread on the threaded portion of the sprinkler head, when tightened inwardly.

5. The combination of claim 1 wherein the threaded boss is centrally positioned, and said end walls slant substantially congruently towards one another so that the two halves of the branch fitting defined by a bisecting plane directed along the longitudinal axis of the threaded boss are substantially mirror images of one another in such plane.

6. The combination of claim 5, wherein the branch fitting has keying portions therein and the sealing gasket has laterally-extending keying portions engaging with said keying portions of the branch fitting for preventing the sealing gasket from rotating.

7. An improved one-piece sprinkler head for use with pipe branch fitting of the type having opposing axial end walls that slant axially inwardly towards one another, a cylindrical inner surface adapted for embracement around a pipe at a point where the pipe has a pre-cut hole, an upstanding hollow, internally threaded boss on one side of the boss, a sealing gasket having at least one annular surface portion lying in a generally transverse plane and a saddle-shaped annular surface adapted to conform to the surface of the pipe around the pre-cut hole and being adapted to be confined between and in substantially complete conformity with the adjacent surfaces of the sprinkler head, the embracement member, and the pipe, wherein the improvement comprises:

(a) a threaded portion on the sprinkler head for a retention in the threaded boss and having a generally planar annular surface adapted to bear rotatably on the sealing gasket and being formed adjacent its inner end with a reduced diameter spigot end portion adapted for positioning in the pre-cut hole of the pipe, and adjacent its opposite outer end with at least one wrench receiving surface so that the sprinkler head can be turned by a wrench means to displace the sprinkler head inwardly into the internally threaded boss so as to compress the sealing gasket against the pipe and distribution means for sprinkling fluid exiting the pipe; and, (b) an inward-facing shoulder adjacent to the spigot end portion for abutment with the outer surface of the pipe within the sealing gasket, whereby the compression applied to the gasket by the sprinkler head is restricted to a predetermined limit, the spigot end portion extending axially beyond the threaded portion and being adapted, in use, to extend a short distance beyond said inward-facing shoulder.

8. The combination of claim 7 additionally comprising a washer member positioned in said second inner zone interposed between said annular surface of the sprinkler head and the sealing gasket.

9. In combination:

(a) a pipe branch fitting for use with a pipe having a pre-cut hole;

(b) the branch fitting having (i) a continuous cylindrical tube presenting a cylindrical inner surface adapted for embracement around the pipe at the position of the hole and (ii) opposing axial end walls that slant axially inwardly towards one another, and (iii) an upstanding hollow, internally threaded boss on one side of the member;

(b) a resilient sealing gasket at the inner side of the boss; and, (c) a shipping plug having a continuous side wall extending from an outer end to an inner end, the shipping plug adapted for insertion into said boss, to frictionally engage the internal threading thereof for releasable retainment, and adapted to engage the pre-cut hole in the pipe and extend into the pipe thereby to indexingly position the pipe branch fitting on the pipe; wherein the sealing gasket has at least one annular surface portion lying in a generally transverse plane, and a saddle-shaped annular surface portion adapted to conform to the surface of the pipe around the pre-cut hole and being adapted to be confined between and in substantially complete conformity with the adjacent surfaces of the shipping plug, the branch fitting, and the pipe.

10. The combination of claim 9 additionally comprising a washer member interposed between said at least one annular surface of the sealing gasket and said threaded boss.

* * * * *